United States Patent Office 3,538,007
Patented Nov. 3, 1970

3,538,007
PAINT STRIPPER FOR ALUMINUM
AND MAGNESIUM SURFACES
Joseph Cooper and William J. Corbett, Cincinnati, Ohio, assignors to W. R. Grace & Co., New York, N.Y., a corporation of Connecticut
No Drawing. Filed Dec. 4, 1967, Ser. No. 687,442
Int. Cl. C11d 7/08
U.S. Cl. 252—144               10 Claims

ABSTRACT OF THE DISCLOSURE

Paints are removed from surfaces of magnesium, aluminum, and their alloys with other metals without significant metal corrosion using a paint stripper comprising from 54 to 77 parts chlorinated liquid hydrocarbon solvent, from 1 to 4 parts of a carboxylic acid having from 1 to 4 carbons, from 1 to 6 parts of propargyl alcohol, from 0–2 parts nonionic wetting agent, from 0–15 parts liquid aromatic hydrocarbon solvents, from 0–6 parts coupling agent, from 0–30 parts of a phenol or alkyl substituted phenol, from 0–2 parts thickener and from 0–2 parts of an evaporation retarder.

---

This invention relates to compositions for removing or stripping paint, varnish, enamel, lacquer and the like from surfaces of aluminum, magnesium and their alloys.

In summary, the composition of this invention for stripping paint from surfaces of aluminum, magnesium or their alloys without significant corrosion thereof comprises from 54 to 77 parts by weight of a chlorinated liquid hydrocarbon solvent, from 1 to 4 parts by weight of an acid selected from the group consisting of formic, acetic, propionic, butyric acids and mixtures thereof, from 1 to 6 parts by weight of propargyl alcohol, from 0–2 parts by weight of a nonionic wetting agent, from 0–15 parts by weight of a liquid aromatic hydrocarbon solvent, from 0–3 parts by weight of a coupling agent selected from the group consisting of lower aliphatic alcohols and their glycol ethers, from 0–20 parts by weight of a member selected from the group consisting of phenols and alkyl substituted phenols having from 1–9 carbons in the alkyl groups, from 0–2 parts by weight of a thickener, and from 0–2 parts by weight of an evaporation retarder. The process of this invention is a method for stripping paint from aluminum and magnesium surfaces without significant corrosion thereof comprising applying to the painted surfaces the above paint stripping composition and removing loosened paint from the surfaces. The term "paint" is intended to include coatings normally considered to be paints as well as and including varnishes, enamels, lacquers and the like.

Acid activated paint strippers, that is, paint stripping compositions containing lower carboxylic acids, phenols and/or alkyl substituted phenols, are used to strip paint and similar coatings from surfaces of metal, wood, glass and brushes. They have not been suitable for stripping paint from surfaces of aluminum, magnesium or their alloys because the acid components corroded the surfaces. Conventional corrosion inhibitors for aqueous systems such as chromates and condensed phosphates could not be suitably formulated in an organic liquid system. Organic corrosion inhibitors are usually basic amines which would neutralize the acid components, thereby eliminating the activation provided by the acids.

It is the object of this invention to provide a paint stripping composition which is stable and which can be applied to aluminum, magnesium, and alloys containing aluminum and/or magnesium with other metals to effectively remove paints therefrom without significantly corroding the metal surfaces.

All concentrations are given herein as weight percents or parts by weight unless otherwise specified.

The paint stripping composition of this invention contains the components in the concentrations set forth in Table A.

TABLE A

|  | Weight percent | |
|---|---|---|
|  | Operable | Preferred |
| Chlorinated solvent | 54–77 | 56–60 |
| Carboxylic acid | 1–4 | 2–4 |
| Propargyl alcohol | 1–6 | 3–6 |
| Wetting agent | 0–2 | 1–2 |
| Aromatic liquid hydrocarbon | 0–15 | 3–4 |
| Coupling agent | 0–6 | 2–3 |
| Phenols | 0–30 | 25–28 |
| Thickener | 0–2 | 1–1.5 |
| Evaporation retarder | 0–2 | 1–2 |

The chlorinated solvent can be a chlorinated hydrocarbon such as methylene chloride, ethylene dichloride, trichloroethylene, methylchloroform, propylene dichloride, perchloroethylene, 1,2,4-trichlorobenzene and orthodichlorobenzene. All of these chlorinated materials are liquids throughout the entire range of operating temperature normally employed with the compositions of this invention. The preferred chlorinated hydrocarbon is methylene chloride. Mixtures of more than one of these chlorinated compounds can be used.

The carboxylic acids employed in the process of this invention are formic acid, acetic acid, propionic acid, butyric acid or mixtures thereof. A minor proportion of these aliphatic acids can be replaced with aromatic carboxylic acids such as salicylic or benzoic acids, for example, but the most active carboxylic acids are those having from 1–4 carbons. Formic acid is the preferred acid.

Propargyl alcohol is a critical component in the composition of this invention. However, it can be replaced in whole or part by other acetylenic alcohols and diols such as 1,4-butynediol ethylylcyclohexanol, 3-methyl-1-nonyl - 3-ol, 2-methyl-3-butyne-2-ol, alpha-ethynyl-2,4,6-trimethyl-benzyl alcohol 2-methyl-1-pentyn-3-ol, alpha-ethynyl-benzyl alcohol and the like. The preferred acetylenic alcohol is propargyl alcohol.

The wetting agent or agents in the composition of this invention must be compatible with the organic solvents and are preferably nonionic wetting agents. Suitable wetting agents include ethoxylated linear alkanols having from 2 to 20 carbons in the alkanol group and from 5 to 50 ethoxy groups per alkanol group; ethoxylated alkyl phenols (preferaby linear alkyl phenols) having from 6 to 12 carbons in the alkyl group and from 5 to 50 ethoxy groups per alkyl phenol group; linear alkyl sulfonic acids and their salts (preferably higher fatty sufonic acids and their alkali metal or ammonium salts); and an ethoxylated alkyl guanidine amine complex having from 5 to 50 ethoxy groups per alkyl guanidine group.

The suitable aromatic liquid hydrocarbons include benzene, toluene xylene, and Aromatic 150 solvent. The preferred aromatic liquid hydrocarbon is toluene.

The coupling agents, in general, are certain lower aliphatic alcohols, glycols and their glycol ethers. These include lower alkanols such as isopropanol, glycols such as propylene glycol, and glycol ethers such as the methyl ethyl, propyl and butyl ethers of ethylene, diethylene, or propylene glycol. The preferred coupling agent is isopropyl alcohol.

The phenols which can be used in the paint stripper include phenol and hydrocarbon substituted phenols having from 1–9 carbon atoms in the substituent groups, and including lower alkyl phenols such as cresols and xylenols, lower alkyl phenols, and the like. Thus for example, orth-, meta-, and para-cresol and 2,4-, 2,5-, 2,6-, 3,4-, and 3,5-xylenols can be employed. Examples of higher alkyl phenols include propyl, butyl, amyl, octyl, nony, isopropyl, isobutyl, isoamyl, tertiary butyl, and tertiary amyl phenols. The preferred phenols are mixtures of phenols, cresols and xylenols such as cresylic acid.

The evaporation retarder can be any material conventionally used for this purpose in paint strippers. Paraffin wax is a preferred evaporation retarder although other waxes can be used.

The thickener can be any conventional thickening agent used in organic solvent systems. These include paraffins, clays such as bentonites and montmorillonites, cellulosic derivatives such as hydroxy lower alkyl celluoses, fatty acid esters of vegetable and synthetic origin, protein flours such as soya flour, and the like. The preferred thickener is hydroxy butyl cellulose.

The preferred composition of this invention is shown in Table B.

TABLE B

| | Weight percent |
|---|---|
| Methylene chloride | 54–77 |
| Formic acid | 1–4 |
| Propargyl alcohol | 1–6 |
| Nonionic wetting agent | 0–2 |
| Aromatic liquid hydrocarbon | 0–15 |
| Coupling agent | 0–6 |
| Phenols | 0–30 |
| Thickener | 0–2 |
| Paraffin wax | 0–2 |

The process of this invention is effective to remove a wide variety of paints and coatings from surfaces of magnesium, aluminum, and alloys of magnesium and/or aluminum with other metals such as bare AZ31A magnesium alloy (QQ-M-44), clad 2024–T3 aluminum alloy (QQ-A-362) and bare 2024–T3 aluminum alloy (QQ-A-355). Paints which can be effectively removed include acrylic, alkyd, epoxy, lacquer, melamine, oil base, phenolic, polyester, silicone, urethane, urea-formaldehyde condensate, and vinyl paints and modifications and combinations thereof. Not only is the activation from the acid components of the composition retained for more effective paint removal, but the rate of corrosion of the metal surfaces is insignificant with the process of this invention. Corrosion rates of less than 24 mg./dm.$^2$-day are obtained with this composition.

For removing paints from the metal surfaces, the composition is applied and after the paint has softened and loosened from the metal surface, it is removed. Preferably, the stripped surface is rinsed with water spray or an air-water spray combination. The paint stripper can be applied by hand, in a soak tank, or by spraying it against the painted surface, and the rinse can be similarly applied.

The invention is further illustrated by the following specific but nonlimiting examples.

EXAMPLE 1

The following composition was applied to aluminum and magnesium surfaces coated with an epoxy primer covered by a polyurethane enamel, and the softened coatings were stripped from the surfaces by rinsing with water.

| | Weight percent |
|---|---|
| Methylene chloride | 59.0 |
| Formic acid | 4.0 |
| Propargyl alcohol | 6.0 |
| Ethoxylated nonyl phenol (5–50 ethoxy groups) | 2.0 |
| Toluene | 3.0 |
| Isopropanol | 3.0 |
| Cresylic acid | 20.0 |
| Hydroxy butyl cellulose | 1.0 |
| Paraffin wax | 2.0 |

Highly effective removal of the paint with no observable corrosion of the metal surfaces was obtained.

EXAMPLE 2

Total immersion, corrosion tests were conducted with the following composition. The metals were immersed in the composition for 90 hours at 72° F.

| | Weight percent |
|---|---|
| Methylene chloride | 60 |
| Formic acid | 4 |
| Propargyl alcohol | 6 |
| Linear alkyl ($C_8$–$C_9$) phenol ethoxylate (5–50 ethoxy groups) | 2 |
| Cresylic acid | 28 |

The results found follow:

| Metal: | Weight change, mg./dm.$^2$-day (24 hours) |
|---|---|
| Clad 2024–T3, aluminum (QQA362) | −0.1033 |
| Bare 2024–T3, anodized aluminum (QQA355) | −0.3099 |
| Bare 2024–T3, anodized aluminum (QQA355) | −0.2066 |
| Bare 7178–T6, anodized aluminum (MIL-A-9180) | −0.3099 |
| Bare AZ31A magnesium alloy, QQ44 (MIL-3171-Type III) | +0.2754 |

The invention claimed is:

1. A composition for stripping paint from surfaces of aluminum, magnesium, or their alloys without significant corrosion, said composition thereof consisting essentially of:
   (a) from 54 to 77 parts by weight of a chlorinated liquid hydrocarbon solvent selected from the group consisting of methylene chloride, ethylene dichloride, trichloroethylene, methylchloroform, propylene dichloride, perchloroethylene, 1,2,4 - trichlorobenzene and orthodichlorobenzene;
   (b) from 1 to 4 parts by weight of an acid selected from the group consisting of formic, acetic, propionic and butyric acids;
   (c) from 1 to 6 parts by weight of propargyl alcohol;
   (d) from 0 to 2 parts by weight of a nonionic wetting agent selected from the group consisting of ethoxylated linear alkanols having from 2 to 20 carbons in the alkanol group and from 5 to 50 ethoxy groups per alkanol group; ethoxylated alkyl phenols having from 6 to 12 carbons in the alkyl group and from 5 to 50 ethoxy groups per alkyl phenol group, linear higher fatty sulfonic acids and their salts, and ethoxylated alkyl guanidine amine complex having from 5 to 50 ethoxy groups per alkyl guanidine group;
   (e) from 0 to 15 parts by weight of a liquid aromatic solvent selected from the group consisting of benzene, toluene, xylene;
   (f) from 0 to 6 parts by weight of a coupling agent selected from the group consisting of lower alkanols and their glycol ethers,
   (g) from 0 to 30 parts by weight of a member selected from the group consisting of phenols and alkyl substituted phenols having from 1 to 9 carbons in the alkyl groups,
   (h) from 0 to 2 parts by weight of a thickener selected from the group consisting of paraffin, bentonite clay, montmorillonite clay, hydroxy lower alkyl celluloses, and soya flour; and
   (i) from 0 to 2 parts by weight of paraffin wax.

2. The composition of claim 1 wherein the chlorinated liquid hydrocarbon solvent is methylene chloride and the acid is formic acid.

3. The composition of claim 1 consisting essentially of
   (a) from 54 to 77 parts by weight of methylene chloride,
   (b) from 1 to 4 parts by weight of formic acid,
   (c) from 1 to 6 parts by weight of propargyl alcohol,
   (d) from 0 to 2 parts by weight of an ethoxylated alkyl phenol having from 8–9 carbons in the alkyl group and from 5 to 50 ethoxy groups per alkyl phenol group,
(e) from 0 to 15 parts by weight of liquid aromatic hydrocarbon solvent,
(f) from 0 to 6 parts by weight of isopropyl alcohol,
(g) from 0 to 30 parts by weight of cresylic acid,
(h) from 0 to 2 parts by weight of a lower alkyl hydroxy cellulose, and
(i) from 0 to 2 parts by weight of paraffin wax.

4. The process of stripping paint from surfaces of aluminum, magnesium, and their alloys comprising applying to the painted surfaces the paint stripping composition of claim 1, and removing loosened paint from the surfaces.

5. The composition of claim 2 consisting essentially of from 56 to 60 parts by weight of methylene chloride, from 2 to 4 parts by weight of formic acid, and from 3 to 6 parts by weight of propargyl alcohol.

6. The process of stripping paint from surfaces of aluminum, magnesium and their alloys comprising applying to the painted surfaces the paint stripping composition of claim 2, and removing loosened paint from the surfaces.

7. The process of stripping paint from surfaces of aluminum, magnesium, and their alloys comprising applying to the painted surfaces the paint stripping composition of claim 5, and removing loosened paint from the surfaces.

8. The composition of claim 3 consisting essentially of
(a) from 56 to 60 parts by weight of methylene chloride,
(b) from 2 to 4 parts by weight of formic acid,
(c) from 3 to 6 parts by weight of propargyl alcohol,
(d) from 1 to 2 parts by weight of said ethoxylated alkyl phenol,
(e) from 3 to 4 parts by weight of liquid aromatic hydrocarbon solvent,
(f) from 2 to 3 parts by weight of isopropanol,
(g) from 25 to 28 parts by weight of cresylic acid, and
(h) from 1 to 1.5 parts by weight of a lower alkyl hydroxy cellulose, and
(i) from 1 to 2 parts by weight of paraffin wax.

9. The process of stripping paint from surfaces of aluminum, magnesium, and their alloys comprising applying to the painted surfaces the paint stripping composition of claim 3, and removing loosened paint from the surfaces.

10. The process of stripping paint from surfaces of aluminum, magnesium, and their alloys comprising applying to the painted surfaces the paint stripping composition of claim 8, and removing loosened paint from the surfaces.

References Cited

UNITED STATES PATENTS

| 2,443,173 | 6/1948 | Baum et al. | 252—127 |
| 2,507,983 | 5/1950 | Kuentzel | 252—144 |
| 2,705,207 | 3/1955 | Stevens | 134—38 X |
| 3,231,507 | 1/1966 | Beale et al. | 252—146 |

FOREIGN PATENTS

| 837,955 | 6/1960 | Great Britain. |

MAYER WEINBLATT, Primary Examiner

A. RADY, Assistant Examiner

U.S. Cl. X.R.

134—38; 252—142, 143, 146, 162, 169